United States Patent [19]

Copenhafer

[11] 3,927,257

[45] Dec. 16, 1975

[54] DUPLEX SIGNALING CIRCUIT

[75] Inventor: Dennis Lee Copenhafer, Cherry Hill, N.J.

[73] Assignee: Bell Telephone Laboratories, Incorporated, Murray Hill, N.J.

[22] Filed: July 5, 1974

[21] Appl. No.: 485,821

[52] U.S. Cl. .................................................. 178/60

[51] Int. Cl.$^2$ .......................................... H04L 5/14

[58] Field of Search ...... 178/58 R, 59, 60; 343/175, 343/176

[56] References Cited

UNITED STATES PATENTS

| | | | |
|---|---|---|---|
| 3,566,032 | 2/1971 | Carbone | 178/59 |
| 3,725,582 | 4/1973 | Davis | 178/58 R |
| 3,730,993 | 5/1973 | Moriyasu | 178/59 |

*Primary Examiner*—Douglas W. Olms
*Attorney, Agent, or Firm*—C. H. Davis; H. R. Popper

[57] ABSTRACT

A bridge type duplex signaling circuit having a transmitter for sending signals over a transmission line and a signaling receiver for receiving signals from the transmission line. The receiver includes two parallel connected comparator circuits each comprising NPN and PNP transistors wired in a configuration such that at least one of the two comparators responds to received signaling when the signaling voltage has been summed with a spurious voltage present on the line that shifts the signaling outside a range defined by the supply potentials to the comparators.

6 Claims, 1 Drawing Figure

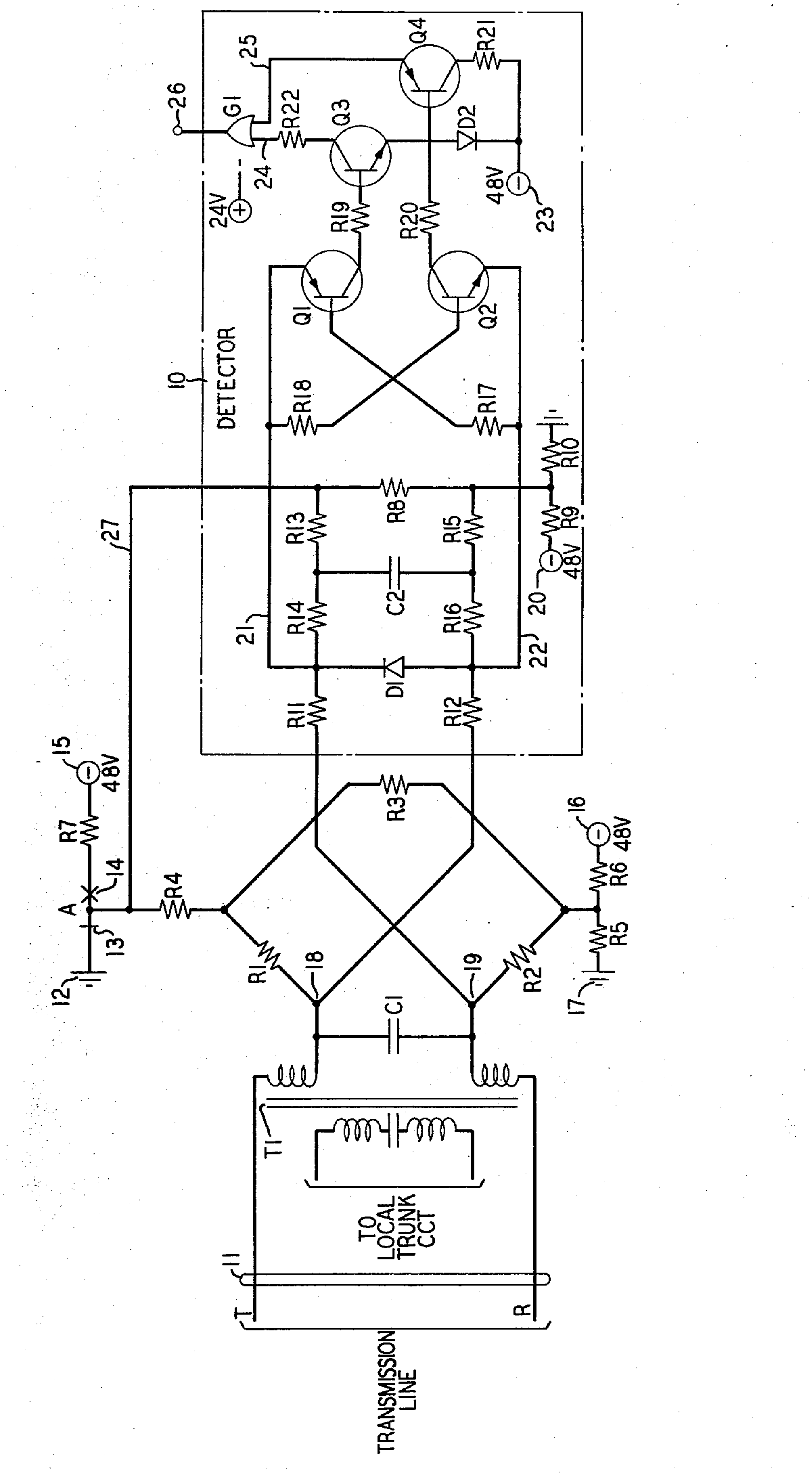
DETECTOR
10
TO LOCAL TRUNK CCT
TRANSMISSION LINE
T
R
T1
11
C1
C2
D1
D2
G1
Q1
Q2
Q3
Q4
R1
R2
R3
R4
R5
R6
R7
R8
R9
R10
R11
R12
R13
R14
R15
R16
R17
R18
R19
R20
R21
R22
A
12
13
14
15
16
17
18
19
20
21
22
23
24
25
26
27
48V
24V

DUPLEX SIGNALING CIRCUIT

BACKGROUND OF THE INVENTION

This invention relates to duplex signaling circuits for a telephone communication system and, more particularly, to an improved signaling receiver.

In telecommunication systems it is frequently necessary to simultaneously transmit signals in both directions over a transmission line between two central offices or terminal stations in order to establish a communication connection therebetween. Duplex signaling equipment located at central offices or terminal stations for establishing such communication connections are well known in the art. One well known duplex signaling circuit utilizes a sensitive four winding polar relay, the windings of which are identical and which are wired in a bridge circuit configuration. The bridge circuit is connected to the transmission line and a balancing network is provided for each circuit and is adjusted according to the impedance of the line. When the bridge circuit is properly balanced, transmitted signaling applied to the transmission path via the bridge circuit results in electrical currents flowing through the relay windings creating flux fields therein which cancel each other and the relay is not operated. Signaling received over the transmission path, however, results in electrical currents flowing through the relay windings creating flux fields therein which add and the relay is operated and released corresponding to the received signaling.

Electrical current flowing through the bridge circuit polar relay windings caused by: (1.) differences in battery voltage potentials of the duplex signaling circuits at either end of the transmission path; (2.) longitudinally induced 60 Hz voltages on the path; and (3.) earth ground potential differences, all result in relay flux fields which cancel each other and again the polar relay is not operated. Despite the fact that these spurious voltages add with signaling voltages on the transmission path, the polar relay does not detect the spurious voltage component of the summed voltages due to flux field cancellation, but does detect received signaling.

Other prior art duplex signaling circuits which are electronic rather than electromechanical utilize the bridge circuit configuration in order to be compatible with existing electromechanical duplex signaling circuits of the type described hereinabove. The relay windings in the bridge circuit are replaced by resistors and a solid state signaling detector is connected to the bridge to detect received signaling. A balancing network is again provided and transmitted signaling and spurious voltages are not detected by the detector just as they were not detected by the polar relay signaling detector.

Attempts have been made at eliminating the balancing networks, which must be very carefully adjusted, but the spurious line voltages are not cancelled out in the bridge circuit and this has not been satisfactory. The spurious voltages add with the signaling voltages and sometimes shift the signaling outside the operational range of the solid state detector and the signaling is lost. Two techniques have been utilized to overcome this problem but both of these techniques have proven less than satisfactory. The first of these techniques is to increase the supply voltage to the detector and thereby increase its operational range. The spurious voltages, however, are sometimes greater than any practical increase in supply voltage and some signaling is still lost due to it being shifted outside the operational range of the detector. The second technique is to use a resistor divider network to limit the excursions of the voltages on the transmission line to within the operational range of the detector. This technique, however, also reduces the amplitude of signaling voltages being received over the line to such low levels as to increase detector complexity beyond practicality. Accordingly, there is a need in the prior art for a duplex signaling circuit detector which does not need an adjustable balancing network and which can detect all signaling received over a transmission line although the signaling is summed with spurious voltages.

SUMMARY OF THE INVENTION

The foregoing need of the prior art is solved in an illustrative embodiment of my invention in which I provide a duplex signaling circuit signaling detector comprising two parallel connected solid state circuits that are connected via a nonadjustable resistor bridge circuit to a transmission line. The operational ranges of these two circuits overlap each other to assure that signaling received over the transmission line is detected, despite the signaling being summed with spurious voltages on the line.

More specifically, the solid state circuits of my signaling detector each comprise an NPN and a PNP transistor. Each circuit compares voltages received on the transmission line with a reference voltage to detect signaling and is arranged such that when received signaling is summed with spurious line voltages as to be outside the range defined by the potentials powering the circuits, at least one of the circuits will respond to detect the signaling.

I also connect a balanced resistor-capacitor network across the inputs of my solid state circuits to provide a leakage path to partially cancel the effects of longitudinal induced voltages on the signaling and to apply the reference voltage to the comparing circuit.

DESCRIPTION

In the FIGURE, the components shown therein have the following values or identities:

| Resistors | |
|---|---|
| R1, R2 — | 370 ohms |
| R3 — | 6980 ohms |
| R4 — | 229 ohms |
| R5 — | 402 ohms |
| R6 — | 600 ohms |
| R8 — | 3570 ohms |
| R9 — | 2320 ohms |
| R10 — | 1500 ohms |
| R11, R12 — | 30100 ohms |
| R13, R15 — | 15400 ohms |
| R14, R16 — | 14700 ohms |
| R17, R18 — | 1100 ohms |
| R19, R20 — | 110000 ohms |
| R21, R22 — | 46400 ohms |

| Diodes | Resistance Lamp |
|---|---|
| D1 — WECo 458C | R7 — WECo 19A |
| D2 — WECo 458A | |

| Transistors | Capacitor |
|---|---|
| Q1, Q4 — WECo 51F | C1 — WECo 535HC, 3.24 $\mu$F |
| Q2, Q3 — WECo 66G | C2 — WECo 542C, 0.25 $\mu$F |

Referring now to the FIGURE, therein is shown a modified bridge type signaling circuit comprising resistors R1, R2 and R3 connected via transformer T1 to transmission line 11 leads T and R, and my novel signaling detector circuit 10 is connected to the bridge circuit. To establish a calling connection over transmission line 11 d.c. signaling is received and transmitted over lead T of line 11 by the signaling equipment shown in the FIGURE to signaling equipment (not shown) at a remote end of line 11. Relay A, the coil of which is not shown, is operated and released in a manner well known in the art and its contacts 13 and 14 are opened and closed to respectively indicate off- and on-hook supervision and also to transmit call signaling to the remote signaling equipment.

More specifically, in an on-hook state relay A is released and ground potential 12 is applied via its break contact 13, resistors R4 and R1, and transformer T1 to the T lead of line 11. In an off-hook state relay A is operated, resistively applying potential 15 via its make contact 14, resistors R7, R4 and R1, and transformer T1 to lead T. For each transmitted dial pulse, relay A is momentarily released to apply ground potential 12 to lead T over the path just described. Supervision and signaling received from the remote equipment is detected by my novel detector 10 as described in greater detail hereinafter. After the calling connection is established, voice frequency communication signals pass between local terminal station equipment (not shown) and remote terminal station equipment (not shown) via a path including transmission line 11, transformer T1, capacitor C1, and a local trunk (not shown), in a manner well known in the art.

The R lead of line 11 is used to correct for a difference in earth ground potential between the local signaling circuit shown in the FIGURE and the remote signaling circuit, and to compensate for any difference in power supply potentials between the local and remote signaling circuits. This is accomplished by the reference voltage created at the junction of resistors R5 and R6 by dividing potential 16 across these resistors then applying the reference potential via resistor R2 and transformer T1 to lead R as as well known in the art.

Longitudinal a.c. currents which flow in the same direction through leads T and R at the same time are often induced onto leads T and R of line 11 by 60 Hz induction. In the prior art, when the resistance of resistor R1 equals that of R2 and resistor R3 is an impedance equal to the sum of the resistances of resistors R1 and R2, the impedance of windings of transformer T1, and the impedance of transmission line leads T and R, the effects of the longitudinal currents on leads T and R on detector 10 completely cancel each other and are not sensed by the detector. Practically, however, this requires adjustment of the values of a network in place of resistor R3 in the bridge circuit to match the impedance of the specific line 11 to which the bridge circuit is connected as has been done in the prior art. Such adjustment of network values is time consuming and is dispensed with for the bridge circuit functioning with my detector 10 as evidenced by insertion of pure resistance, specifically, resistor R3. As a result, spurious longitudinal voltages being summed with signaling voltages received over line 11 from the remote signaling circuit are input to my detector 10, but without the detrimental effects experienced in the prior art. In the prior art failure to completely cancel out longitudinal voltages oftentimes caused the signaling voltages summed therewith to be shifted outside the operational range of a prior art detector and the signaling would be lost.

With my novel detector 10 I provide two solid state circuits for detecting signaling voltages that have been summed with longitudinal voltages comprising the pair of transistors Q1 and Q3, and the pair of transistors Q2 and Q4. Transistors Q1 through Q4 are switching transistors and may be any of many commercially available transistors as well as the Western Electric Company transistors used in this embodiment of the invention. detail is described in detail hereinafter, one of the pair of transistors has a detection range which differs from but overlaps the detection range of the other pair of transistors. This provides an overall detection range of detector 10 that results in no received signaling being lost.

More specifically, novel detector circuit 10 is connected to the bridge circuit at points 18 and 19 and resistors R11 and R12 provide a relatively high input impedance to the detector. A balanced network comprising resistors R13, R14, to R16 and R8, and capacitor C2 is connected to the detector 10 side of input resistors R11 and R12. The resistance of resistor R13 equals that of resistor R15 and the resistance of resistor R14 equals that of resistor R16. The purpose of this network is to provide a balanced leakage path for longitudinal currents and to sum the received signaling voltages with a reference voltage, which is created by dividing potential 20 between resistors R9 and R10, and then dropping the resultant reference voltage across resistor R8. As relay A operates and releases, capacitor C2 causes the change in reference potential across R8 to match the change in potential between points 18 and 19. Diode D1 prevents reverse breakdown of the emitter-base junction of transistors Q1 through Q4 and may be any of many commercially available diodes as well as the Western Electric Company diode used in this embodiment of the invention.

It should be noted that the received signaling voltage creates a difference in potential between points 18 and 19 and this difference, after being input to detector 10 via resistors R11 and R12 and summed with the reference voltage, is present on leads 21 and 22. The potential on lead 21 is directly applied to the emitter terminal of PNP transistor Q1 and is applied via resistor R18 to the base terminal of transistor Q2. Similarly, the potential on lead 22 is directly applied to the emitter terminal of NPN transistor Q2 and is applied via resistor R17 to the base terminal of transistor Q1. Transistor Q3 is connected to transistor Q1 via resistor R19 and transistor Q4 is connected to transistor Q2 via resistor R20. Thus, the difference in potential between leads 21 and 22 due to received signaling is applied to the emitter base junction of both transistors Q1 and Q2 which thereby function as comparators to detect the signaling.

In the absence of longitudinal voltages on line 11 a dial pulse received over the line results in lead 22 being more negative in potential than lead 21, although they are both negative but more positive than −48 volts. As a result transistors Q1, Q2, Q3 and Q4 are all forward biased and they all conduct. Transistor Q1 conducts over a path from lead 21, from the emitter to collector terminals of transistor Q1, through resistor R19, from the base to emitter terminals of transistor Q3, and through diode D2 to potential 23. Transistor Q2 conducts over a path from the +24 volt source that is biasing OR gate G1, through input lead 25, from the emitter to base terminals of transistor Q4, through resistor R20, and from the collector to emitter terminals of transistor Q2 to lead 22. Transistor Q3 conducts over a path from the +24 volt source biasing OR gate G1, and through lead 24, through resistor R22, transistor Q3, and diode D2 to potential 23. Transistor Q4 conducts over a path from the +24 volts present at input 25 of gate G1, through transistor Q4 and resistor R21 to potential 23. With transistors Q3 and Q4 conducting, inputs 24 and 25 of OR gate G1 are both high and output 26 of gate G1 is high indicative of the dial pulse received over line 11 from the remote signaling circuit.

In the event that longitudinal voltages are present on line 11 that cause the signaling potential on lead 21 to be more negative than −48 volts, a dial pulse received over line 11 will result in transistors Q2 and Q4 conducting while transistors Q1 and Q3 will be nonconducting because the path comprised by the emitter-collector junction of Q1, resistor R19, the base-emitter junction of Q3 and diode D2 will be back biased. Thus, input 25 of OR gate G1 is negative and there is a signal on output 26 of gate G1 indicative of the received dial pulse.

Similarly, in the event that longitudinal voltages are present on line 11 that cause leads T and R to be more positive and particularly to cause lead 22 to have a signaling potential thereon more positive than +24 volts, signaling on line 11 is still received. Lead 22 is still negative with respect to lead 21 and a dial pulse is received over line 11 which results in transistors Q1 and Q3 conducting and transistors Q2 and Q4 will be nonconducting. Thus, output 26 of gate G1 again has a signal thereon indicative of the received dial pulse.

In summary, when my novel detector 10 is utilized, the bridge circuit functioning therewith need not be balanced to line 11 to cancel the effects caused by longitudinal voltages induced onto line 11. The longitudinal voltages may shift received signaling potentials outside the range between the supply potentials to the detector in both a positive and negative direction, and the signaling will still be detected.

As the bridge circuit is not balanced to line 11 when utilizing my novel detector 10, signaling generated by contacts 13 and 14 of relay A is not cancelled out by the bridge circuit, as is taught by the prior art, and is also received by detector 10. To prevent this detection of transmitted signaling, lead 27 is utilized in a manner well known in the art. Each time relay A is momentarily released for a transmitted dial pulse, ground potential 12 is applied via break contact 13 and lead 27 to the resistive network at the junction of resistors R8 and R13. Current flows through resistor R8 between the ground potential on lead 27 and the reference potential at the junction of resistors R9 and R10. This causes the reference potential to become more negative and offsets the effect of the transmitted dial pulse at the input of detector 10 so the pulse is not detected. If, however, a dial pulse is received from the remote signaling circuit at the same instant a dial pulse is being transmitted by relay A, the received pulse is still detected.

While I have described above the principles of my invention in connection with specific apparatus, it is to be clearly understood that this description is made only by way of example and not as a limitation to the scope of my invention.

What I claim is:

1. A signaling arrangement having an input from a transmission line and a receiver for detecting signaling voltages on said line that are summed with spurious voltages thereon, said receiver comprising
   a first and a second source of potential,
   first circuit means connected to said input for detecting ones of said signaling voltages that are within a range between said potentials and for further detecting others of said signaling voltages that have been shifted by said spurious voltages outside said range in a positive direction, and
   second circuit means connected to said input for detecting said ones of said signaling voltages within said range and for further detecting others of said signaling voltages that have been shifted by said spurious voltages outside said range in a negative direction.

2. The invention in accordance with claim 1 further comprising means responsive to at least one of said detecting means for providing an output corresponding to said signaling voltages.

3. A signaling arrangement for transmitting and receiving signals over a transmission line comprising
   a first and a second source of potential,
   means for providing a reference voltage,
   first circuit means for detecting signaling voltages received over said line that are within a range between said potentials and for further detecting signaling voltages that are shifted by spurious voltages outside said range in a positive direction by comparing said signaling voltages to said reference voltage,
   second circuit means for detecting said received signaling voltages that are within said range and for further detecting signaling voltages that are shifted by spurious voltages outside said range in a negative direction by comparing said signaling voltages to said reference voltage,
   means for transmitting signals over said line, and
   means coupling said transmitting means to each of said circuit means for inhibiting said circuit means from responding to said transmitted signals and for nevertheless allowing the detection of signaling voltages concurrently received from said line by said circuit means.

4. The invention in accordance with claim 3 further comprising a logic OR gate responsive to either of said circuit means detecting said received signaling voltages on said line for providing an output corresponding to said received signaling.

5. A duplex signaling circuit for transmitting and receiving signals over a transmission line comprising
   means for transmitting signals over said line,
   first network means connected to said line for receiving signals from said line and for providing a path via which said transmitting means applies signals to said line,
   means for providing a reference voltage,
   second network means connected to both said first network means and said reference voltage providing means for summing said received signals and said reference voltage,
   a first and a second source of potential,
   first comparator means connected to said second network means for detecting signals received over said line by said first network means wherein said detected signals are within a range between said potentials and for further detecting signals that are shifted outside said range in a positive direction, second comparator means connected to said second network means for detecting signals received over said line by said first network means wherein said detected signals are within said range and for further detecting signals that are shifted outside of said range in a negative direction by said spurious voltages, means coupling each of said comparator means to said transmitting means for blocking said comparators from responding to said transmitted signals and for nevertheless allowing the detection of signals concurrently received over said line, and logic gate means responsive to at least one of said comparator means detecting signals received over said line for providing an output corresponding to said received signals.

6. The invention in accordance with claim 5 wherein said first comparator means comprises a first PNP transistor, having an emitter terminal connected to a first of two leads of said transmission line and a base terminal connected to a second of the two leads of said line, a first NPN transistor, having a base terminal connected to the collector terminal of said first PNP transistor, an emitter terminal connected to said first source of potential, and a collector terminal connected to said second source of potential, wherein said second comparator comprises a second NPN transistor, having an emitter terminal connected to said second lead and a base terminal connected to said first lead, and a second PNP transistor, having a base terminal connected to the collector terminal of said first NPN transistor, a collector terminal connected to said first source of potential and an emitter terminal connected to said second source of potential.

* * * * *